July 29, 1930.   F. C. WILSON   1,771,599

ADJUSTABLE SEALING STRIP FOR DOORS

Filed May 2, 1928   2 Sheets-Sheet 1

Inventor
Fred C. Wilson.
By Frank Keiper
Attorney

July 29, 1930. F. C. WILSON 1,771,599
ADJUSTABLE SEALING STRIP FOR DOORS
Filed May 2, 1928 2 Sheets-Sheet 2
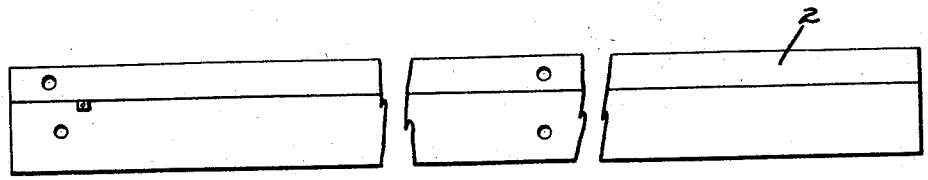
Fig-7-
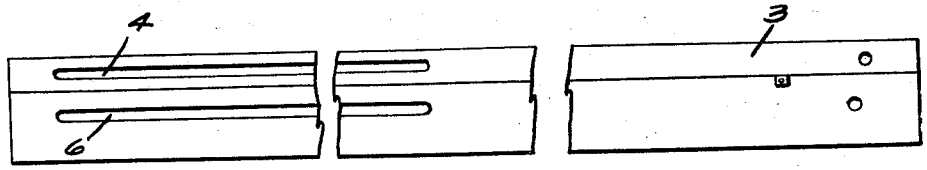
Fig-8-
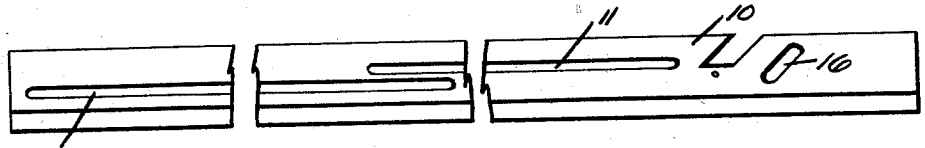
Fig-9-
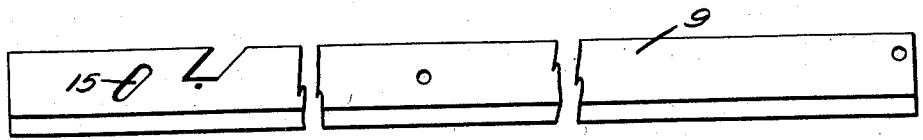
Fig-10-
Inventor
FRED C. WILSON
By Frank Keifer
Attorney Patented July 29, 1930

1,771,599

UNITED STATES PATENT OFFICE

FRED C. WILSON, OF ROCHESTER, NEW YORK; BELLE E. WILSON EXECUTRIX OF SAID FRED C. WILSON, DECEASED

ADJUSTABLE SEALING STRIP FOR DOORS

Application filed May 2, 1928. Serial No. 274,627.

The object of this invention is to provide a new and improved self adjusting weather strip for doors. This and other objects of the invention will be illustrated in the drawings, described in the specification and pointed out in the claims at the end thereof.

In the drawings:

Fig. 7 is a detail view of one of the stationary Z bars.

Fig. 8 is a detail view of the other stationary Z bar.

Fig. 9 is a detail view of one of the moving bars.

Fig. 10 is a detail view of the other moving bar.

In the drawings like reference numerals indicate like parts.

Figure 1:
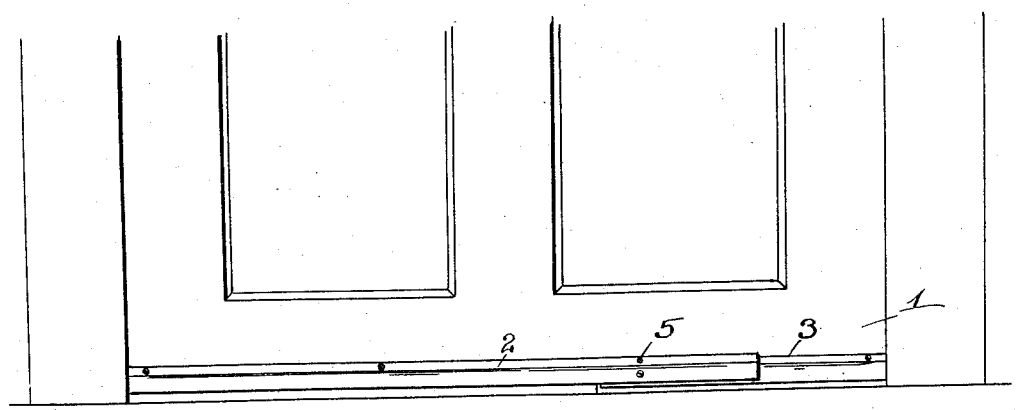
Figure 1 shows a bottom of a closed door with my improved strip in place thereon.

In the drawings reference numeral 1 indicates a door having the weather strip fastened on the bottom thereof. The weather strip consists of the two Z bars 2 and 3 which overlap each other for a considerable distance at their inner ends, and which between them extend the full length of the door. These Z bars are adjustable on each other longitudinally, the bar 2 being provided with a slot 4 and the other bar 3 having a screw hole therein through which the screw 5 passes. This screw 5 also passes through the slot in the bar 2 so that the two bars are clamped together on the door along the upper margin of the bars by the screw. Each bar is in length somewhat more than half the width of the widest door which they are intended to fit and they can be extended or telescoped on each other so that the two bars together will have the correct length to fit the width of the door. On the lower flange the bar 3 has a round opening therein and the bar 2 has a slot therein as indicated at 6 through which passes a bolt and a nut. When the nut is loosened up this permits the one bar to slide on the other so as to permit the bars 2 and 3 to be adjusted longitudinally on each other to make the correct length, after which the nut is tightened up to clamp the bars together and thereafter the bars are fastened to the door by means of the screws 5 several of which are used but only one of which passes through the slot 4 in the bar 2.

Figure 2:
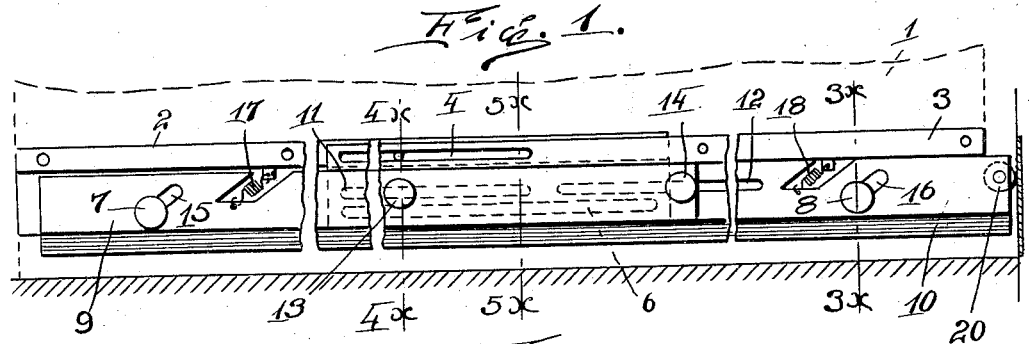
Figure 2 is an enlarged rear elevation of the weather strip.
Figure 3:
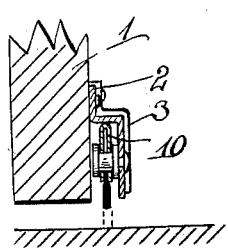
Figure 3 is a vertical section on the line $3^x, 3^x$ of Figure 2.
Figures 4, 6:
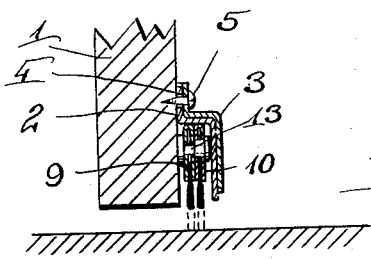
Figure 4 is a vertical section on the line $4^x, 4^x$ of Figure 2.
Figure 6 is a detail perspective view of the bolt and nut that is used for clamping the two sections of the moving bar together.
Figure 5:
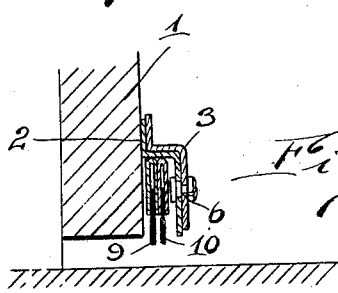
Figure 5 is a vertical section on the line $5^x, 5^x$ of Figure 2.

Each of the bars 2 and 3 is provided with the stationary studs 7 and 8. Mounted to travel on these studs are the bars 9 and 10. These bars overlap each other and one of the bars 9 has two horizontal slots therein 11 and 12 which are placed end to end and in line with each other. The other bar is provided with two bolts 13 and 14 which pass through holes in the bar 10 and through the slots in the bar 9 and by means of these two bolts the bars 9 and 10 are clamped together with the one overlapping the other so that the two bars between them make the correct length desired, the bars 9 and 10 together having the same length as the Z bars 2 and 3 have when clamped together. The bars 9 and 10 are each provided with diagonal slots 15 and 16 which engage with the studs 7 and 8 and by which the bars are raised and lowered from the full line position to the dotted line position in Figures 3 and 4, when the bars 9 and 10 are moved endwise. Between the stationary bars 2 and 3 and the moving bars 9 and 10 springs 17 and 18 are interposed so as to hold the bars 9 and 10 normally in the raised position as shown in full lines in all the figures, and at the right hand end position as shown in Figure 2. The door is hinged on the side shown at the right in Figure 2 and when the door is partially closed the bar 10 makes contact with the door casing. The bars 9 and 10 are both channel shaped, being bent up from thin sheet metal. The channels open down and are filled with flexible weather strips that extend downward from the channels. The right hand end of the bar 10 is provided with an anti-friction roller 20 mounted to rotate in the channel which roller makes contact with the door casing. As the door closes the bars 9 and 10 move to the left as shown in Figure 2 and travel down toward the sill because of the reaction of the studs 7 and 8 on the cam slots 15 and 16. This pushes the bars 9 and 10 down so that the flexible strips carried thereby make close contact with the floor or with the sill. The flexible strips yield in close contact with the floor and trail as the door closes, thus making a close fit with the floor or sill under the door.

It will be understood that when this device is placed on the bottom of a door the bolts 13 and 14 are loosened up. This leaves the two sections of the inner bar and the two sections of the outer section adjustable lengthwise. The two sections of the stationary bar are then adjusted lengthwise and fastened to the door. As the two sections of the stationary bar are adjusted lengthwise the two sections of the moving bar adjust themselves lengthwise as well. The bolts 13 and 14 are then tightened up to clamp the two sections of the moving bar together and the device is ready for use.

I claim:

1. A weather strip adapted to be placed at the bottom of a door, comprising a stationary horizontal strip adapted to be mounted on the bottom of a door, said strip being made in two sections overlapping each other and adjustable lengthwise on each other and capable of being clamped together in any adjusted position, a moving horizontal strip mounted on the stationary strip, said moving strip being composed of two sections overlapping each other and capable of being adjusted lengthwise one on the other and capable of being rigidly fastened together in any adjusted position, one of the moving sections being permanently fastened to one of the stationary sections and the other of the moving sections being permanently fastened to the other stationary section, means by which the moving strip is caused to move endwise and down on the closing of the door and endwise and up on the opening of the door.

2. A weather strip adapted to be placed at the bottom of a door, comprising a stationary horizontal strip adapted to be fastened to the bottom of a door, studs carried on said stationary strip, a moving horizontal strip having diagonal slots therein engaging with said studs by which the movement of the moving strip is controlled and by which the moving strip is positively fastened to the stationary strip, and a spring connecting said strips, whereby said moving strip is caused to move endwise and down on the closing of the door, and endwise and up on the opening of the door, said stationary strip and said moving strip being each made in sections which sections overlap each other and are adjustable lengthwise on each other which sections can be clamped together in any adjusted position by which the length of the strip may be made equal to the width of the door, without interfering with the movement of the moving strip on the stationary strip.

In testimony whereof I affix my signature.

FRED C. WILSON.